United States Patent
Mitra

(10) Patent No.: US 7,801,050 B2
(45) Date of Patent: Sep. 21, 2010

(54) REMOTE TESTING OF AN ELECTRONIC DEVICE VIA NETWORK CONNECTION

(75) Inventor: Somnath Mitra, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 440 days.

(21) Appl. No.: 11/638,059

(22) Filed: Dec. 12, 2006

(65) Prior Publication Data
US 2008/0137543 A1    Jun. 12, 2008

(51) Int. Cl.
*H04J 3/14* (2006.01)

(52) U.S. Cl. .................. 370/242; 370/250; 370/389; 714/33; 714/718

(58) Field of Classification Search .......... 714/724, 714/726; 370/242, 389, 250, 252, 248
See application file for complete search history.

(56) References Cited

U.S. PATENT DOCUMENTS

| 5,732,213 | A * | 3/1998 | Gessel et al. .......... 709/224 |
| 6,876,207 | B2 * | 4/2005 | Haass et al. ............ 324/600 |
| 7,401,271 | B1 * | 7/2008 | MacLellan ............. 714/718 |
| 2003/0177417 | A1 * | 9/2003 | Malhotra et al. ........ 714/42 |
| 2004/0078731 | A1 * | 4/2004 | Becher et al. .......... 714/55 |
| 2004/0081101 | A1 * | 4/2004 | Bennett ................. 370/252 |
| 2005/0110806 | A1 * | 5/2005 | Stobie et al. ........... 345/690 |
| 2005/0262396 | A1 * | 11/2005 | Woodward et al. ..... 714/30 |
| 2006/0271327 | A1 * | 11/2006 | Haggerty .............. 702/121 |
| 2007/0025259 | A1 * | 2/2007 | Reinhold .............. 370/241 |
| 2007/0025261 | A1 * | 2/2007 | Ginsberg et al. ....... 370/250 |
| 2007/0101214 | A1 * | 5/2007 | Stauffer et al. ......... 714/724 |

OTHER PUBLICATIONS

Altera, "IEEE 1149.1 (JTAG) Boundary-Scan Testing in Altera Devices", Copyright Altera Corporation, version 6.0, application note 39, written Jun. 2005, 44 pages.
Freescale, "MPC8360E PowerQUICC™ II Pro Integrated Communications Processor Family Reference Manual", Freescale Semiconductor, MPC8360ERM, Rev. 1, Sep. 2006, chapter 17, 5 pages.

(Continued)

*Primary Examiner*—Ricky Ngo
*Assistant Examiner*—Rasheed Gidado
(74) *Attorney, Agent, or Firm*—Hickman Palmero Truong & Becker LLP

(57) ABSTRACT

An electronic device having logic that allows testing the device via a network interface is disclosed herein. The electronic device comprises the following. The electronic device has testing logic that receives test input signals and generate a test output signal. The electronic device has a network interface that is operable to receive network packets. The electronic device has packet processing logic communicatively coupled to the network interface that is able to determine whether a packet received in the network interface is a packet for testing the apparatus. The packet processing logic extracts test information from packets received on the network interface that are determined to be test packets, and generates the test input signals for the testing logic from the extracted test information. The packet processing logic incorporate test results into network packets based on the test output signal from the testing logic.

20 Claims, 4 Drawing Sheets

OTHER PUBLICATIONS

Freescale, "MPC8560 PowerQUICC III™ Integrated Communications Processor Reference Manual", Freescale Semiconductor, MPC856ORM, Rev. 1, Jul. 2004, Chapter 18, 31 pages.

Zilmer, M., "Non-intrusive On-chip Debug Hardware Accelerates Development for MIPS RISC Processors", MIPS Technologies, Inc., MIPS EJTAG Technical Article, Special for EE Times, retrieved from website <http://www.amslink.com/file/mipsart1.html>, retrieved on Mar. 30, 2007, 4 pages.

U.S. Appl. No. 11/261,683, filed Oct. 28, 2005, Notice of Allowance, Apr. 8, 2008.

* cited by examiner

300

| Test Packet IP Header 302 | Test Packet UDP Header 304 | TDI 306 | TMS 308 | RESET 310 |

| Return Packet IP Header 352 | Return Packet UDP Header 354 | TDO 356 |

FIG. 3B

REMOTE TESTING OF AN ELECTRONIC DEVICE VIA NETWORK CONNECTION

FIELD OF THE INVENTION

The present disclosure generally relates to remote testing of an electronic device via a network connection.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Often electronic devices may need to be tested after leaving the manufacturer. As an example, a router at a customer site may exhibit problems that need to be tested and monitored for internal state transitions. However, many other types of electronic devices face the need for testing. One technique is for the device to perform limited self-testing. For example, the central processing unit (CPU) of some electronic devices has a set of instructions that can test some problems. However, there are limitations to this technique. For example, the CPU may not be able to address cache directly, and thus may not be able to test a cache problem. Another limitation with this technique is that some problems will not occur when the electronic device goes into its self-test mode. As a particular example, the device might set breakpoints at regular intervals to try and step through to detect when a memory overwrite occurs. However, the memory overwrite might only occur if the device is reading in data at a high rate. Therefore, this self-testing is not able to test the problem.

Another technique for testing an electronic device is to connect a device referred to as an "In-Circuit-Emulator" (ICE) to the electronic device. The ICE interfaces with testing logic inside the electronic device. The testing logic may be substantially compliant with an IEEE 1149.1 boundary-scan specification, such as a Joint Test Action Group (JTAG) interface. A disadvantage with this technique is that the ICE is very expensive. Because multiple ICEs may be needed at the customer site if there are many electronic devices this technique is not scalable. To overcome this limitation, the electronic device can be shipped to the manufacturer to be tested. However, shipping the electronic device is often not practical. Moreover, even if the electronic device were to be shipped to the manufacturer for testing, the problem might never be found because certain problems only occur due to the specific way in which the electronic device is being used at the customer site. For example, a router may exhibit problems due to a specific pattern of data traffic that is difficult if not impossible to re-create at the manufacturer.

Therefore, improvements in testing electronic devices are desired.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is an example test packet that is input to a device under test;

FIG. 3B is an example test packet that is output from a device under test.

DESCRIPTION OF EXAMPLE EMBODIMENTS

A method and apparatus for remote testing of an electronic device via a network connection is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 Overview
2.0 Example Environment
3.0 Example Device Under Test
4.0 Example Test Data Packets
5.0 Example Method of Remote Device Testing
6.0 Example of Authenticating a Test Controller
7.0 Example of Forwarding Test Data Packets to Device Under Test
8.0 Implementation Mechanisms - Hardware Overview
9.0 Extensions and Alternatives

1.0 Overview

An electronic device having logic that allows testing the device via a network interface is disclosed herein. The electronic device comprises the following. The electronic device has testing logic that receives test input signals and generates a test output signal. The electronic device has a network interface that is able to receive network packets. The electronic device has packet processing logic that is able to determine whether a packet received on the network interface is a packet for testing the electronic device. The packet processing logic extracts test information from packets received on the network interface that are determined to be test packets, and generates the test input signals for the testing logic from the extracted test information. The packet processing logic incorporate test results into network packets based on the test output signal from the testing logic.

2.0 Example Environment

Figure 1:
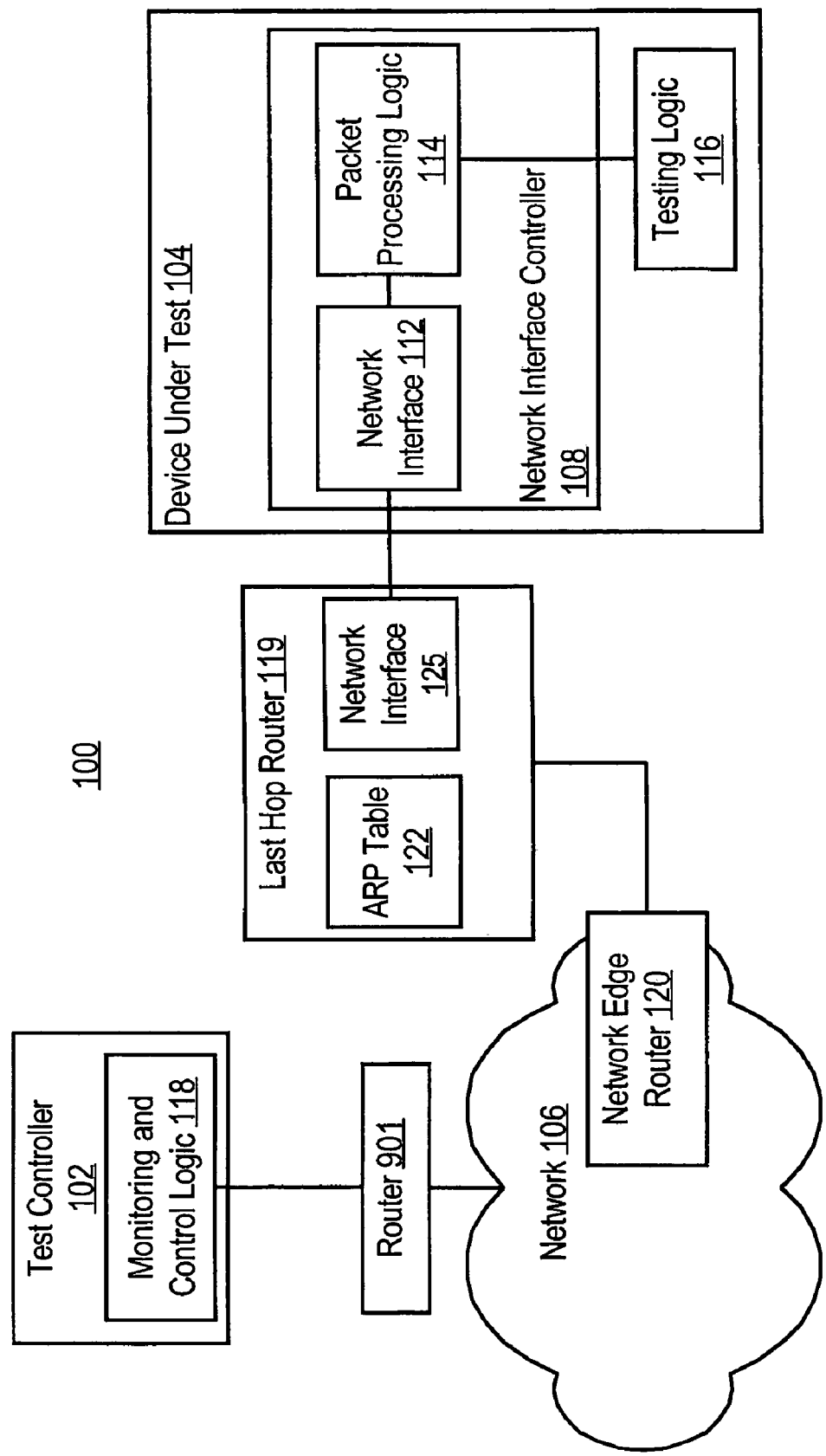
FIG. 1 illustrates an example environment for testing a device under test.

FIG. 1 illustrates an example environment 100 for testing a device under test, in accordance with an embodiment of the present invention. The environment 100 has a test controller 102 communicatively coupled to a device under test ("DUT") 104 through a network 106. The DUT 104 might be at a customer site, but the location of the DUT 104 could be anywhere. The network 106 could be the Internet; however, network 106 is not limited to the Internet. The test controller 102 might be a personal computer. However, the test controller 102 could be any electronic device capable of network communication. The DUT 104 has logic therein that allows the DUT 104 to be tested from a remote location, such as the test controller 102.

The DUT 104 has a network interface controller ("NIC") 108 with a network interface 112 communicatively coupled to the network 106. The DUT 104 has packet processing logic 114 that is able to process packets received by the NIC 108. The packet processing logic 114 is able to detect which packets are test packets, parse the test packets to extract test information, and generate test signals from the test information for the testing logic 116. The packet processing logic 114 is further able to generate packets to send back to the test controller 102, based on a test output signal provided by the testing logic 116.

The test controller 102 monitors and controls the DUT 104 by sending the test packets to the DUT 104 and receiving the return packets from the DUT 104. Note that the test packets sent by the test controller 102 may be modified by one or more of the routers (e.g., routers 119, 120). For example, a router might encapsulate the test packet into an Ethernet frame. The test controller 102 has monitoring and control logic 118 that is operable to generate the test packets. The test packets are of any format suitable for transmission over a network 106. In one embodiment, the network 106 is an IP (Internet Protocol) network and the test packets are substantially compliant with an Internet Protocol.

The test packets contain test information that may be specific to the particular DUT 104. Thus, the monitoring and control logic 118 may have particular knowledge about the DUT 104 that allows it to generate test packets having test information that is appropriate to monitor and control the DUT 104. For example, the monitoring and control logic 118 may be able to generate scan chains that are specific to the DUT 104. These scan chain are included in the test packets. When the packet processing logic 114 parses the test packets, the packet processing logic 114 sends these scan chains to the testing logic 116, in one embodiment.

Router 901, the network edge router 120, and the last hop router 119 with the ARP table 122 and network interface 125 are used to forward the test packets to the DUT 104. Further details of forwarding the test packets is discussed below.

3.0 Example Device Under Test

Figure 2:
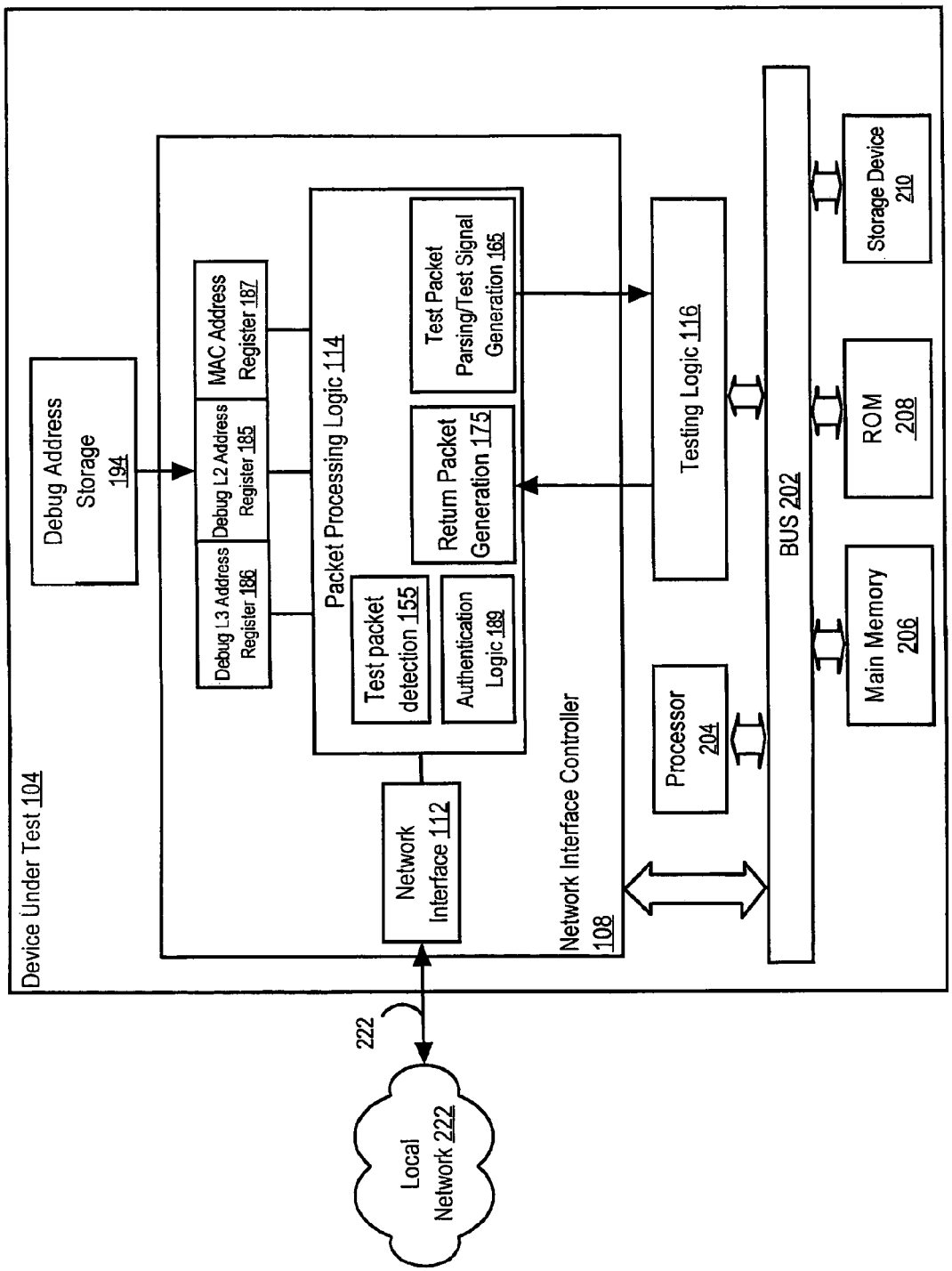
FIG. 2 illustrates an example device under test.

FIG. 2 illustrates an example DUT 104, in accordance with one embodiment. The packet processing logic 114 has test packet detection logic 155, test packet parsing/test signal generation logic 165, and return packet generation logic 175, in this embodiment. The NIC 108 has a debug L2 address register 185, a debug L3 address register 186, and a MAC address register 187. The debug L2 address register 185 contains a "debug address" that can be used to determine if packets received by the DUT 104 are test packets. In one embodiment, the debug address is a special MAC address. The MAC address register 187 contains a device MAC address for the DUT 104 itself. The device MAC address is used for packets intended for the DUT 104 other than test packets. The debug L3 address register 186 contains a layer 3 address, such as an IP address. The layer 3 address can be used in the process of forwarding test packets to the DUT 104, as described herein in section 7.0.

In order to determine which packets received on the network interface 112 are test packets from the test controller 102, the test packet detection logic 155 watches for packets having the debug address as their destination address, in one embodiment. The test packet detection logic 155 may also watch for packets having destination addresses that match the MAC address in the MAC address register 187. These packets are not test packets, and are thus not processed further by the packet processing logic 114. However, the NIC 108, as well as other logic in the DUT 104, may process these non-test packets further. The NIC 108 is an Ethernet controller, in one embodiment. The packet processing logic 114 is implemented in a Medium Access Controller (MAC) of the NIC 108, in one embodiment. However, the packet processing logic 114 is not so limited. In one embodiment, the packet processing logic 114 is in a Physical Layer Interface (PHY). In one embodiment, the packet processing logic 114 is after the MAC in packet direct memory access (DMA) logic.

The debug address is a medium access control (MAC) address, in one embodiment. The debug address may be stored in the debug address storage 194 when the DUT 104 is manufactured. The debug address storage 194 is implemented as an EEPROM, in one embodiment. However, other storage media can be used. The debug address could be provided to the DUT 104 at a time other than device manufacture.

The packet processing logic 114 is able to perform its functions immediately after a power on reset procedure, in one embodiment. This is true even if a problem with the DUT 104 does not allow the DUT 104 to be fully functional. The debug address is transferred from the debug address storage 194 to the packet processing logic 114 during a DUT power on reset procedure, in one embodiment. For example, assertion of a power on reset may cause the DUT 104 to automatically initiate a boot sequence to program registers in the NIC 108, in one embodiment. Included in this register programming is storing the debug address from the debug address storage 194 into a register in the NIC 108. In another embodiment, during power on reset, a configuration word is to provide the debug address on any set of pins external pins of the processor.

When the packet processing logic 114 determines that a packet is a test packet, the test packet parsing/test signal generation 165 extracts test information from the test packet and provides the testing logic 116 with test signals. In one embodiment, the test signals are substantially compliant with signals used in a Joint Test Action Group (JTAG) interface. Examples, of these test signals include Test Data Input (TDI), test mode select (TMS), test reset (TRST), and test clock (TCK). The data sent in one or more of the test signals can be a scan chain used to test the DUT 104. Based on results of applying the test signals, the testing logic 116 returns test result data to the return packet generation 175. In one embodiment, the test result data is sent as a Test Data Output (TDO) JTAG signal. The return packet generation 175 encapsulates the test result data into network packets, which are sent to the test controller 102 via the network 106 by the network interface controller 108.

The testing logic 116 inputs test signals and is able to perform various testing functions on the electronic device based the test signals. As used throughout this description, the testing functions include monitoring and controlling at least a portion of the DUT 104. The portion of the DUT 104 that can be controlled and monitored includes, but is not limited to, a processor 204. Thus, the test controller 102 can perform remote monitoring and control of the processor 204 of the DUT 104. In one embodiment, the testing logic 116 is substantially compliant with a Joint Test Action Group (JTAG) interface. However, the testing logic 116 is not limited to a JTAG interface.

The example DUT 104 can function as a network router. However, it is not required that the DUT 104 have the ability to route network packets. Further details of the example DUT 104, including the ability to route network packets, are discussed herein below.

4.0 Example Format for Test Packets

FIG. 3A is an example format for a test packet 300 that is delivered from the test controller 102 to the DUT 104, in accordance with an embodiment of the present invention. The example packet format uses a User Datagram Protocol (UDP) as a transport layer protocol. However, another transport layer protocol such as a Transport Control Protocol (TCP) may be used instead. The example format does not depict layer 2 information. For example, the format does not depict an Ethernet header. It will be understood that the example test packet 300 may be encapsulated into an Ethernet frame.

The example test packet 300 contains a test packet IP header 302, which contains the IP address associated with the packet processing logic 114 of the DUT 104. Note that this typically will not be the IP address of the DUT 104 itself. Rather, this "test" IP address is a special IP address that is used for testing purposes. The Test packet IP header 302 also contains the IP address of the test controller 102. The packet processing logic 114 stores the IP address of the test controller 102 in order to construct a return packet to the test controller 102.

The example packet has a test packet UDP header 304, which contain information for the packet processing logic 114 to process the test data packet 300.

The TDI data field 306 contains test input data. In one embodiment, the TDI data field 306 is used by the packet processing logic 114 to generate data for a Test Data Input (TDI) JTAG signal, which may be provided to the testing logic 116. However, the packet processing logic 114 could generate a signal other than a JTAG TDI signal. For example, the testing logic 116 is not limited to using a JTAG interface. In general, the packet processing logic 114 generates from the TDI data field 306 whatever test input signals are suitable to interface with the testing logic 116.

The TMS data field 308 contains test mode data. In one embodiment, the TMS field 308 is used by the packet processing logic 114 to generate data for a Test Mode Select (TMS) JTAG signal. However, the packet processing logic 114 could generate a signal other than a JTAG TMS signal. In general, the packet processing logic 114 generates from the TMS data field 308 whatever test input signal is suitable to instruct the testing logic 116 as to the test mode.

The RESET field 310 is for a reset signal. This signal can be used to reset circuitry in the DUT 104 that performs a test on the DUT 104. In one embodiment, the RESET field 310 is used by the packet processing logic 114 to generate a JTAG TRST signal. However, the packet processing logic 114 could generate a signal other than a JTAG TRST signal. The packet processing logic 114 could also ignore the RESET field 310.

FIG. 3B is an example format for a return packet 350 that is delivered from the DUT 104 to the test controller 102, in accordance with an embodiment of the present invention. The packet processing logic 114 may generate the example return packet 350 based on a data returned from the testing logic 116. The packet processing logic 114 uses the stored IP address of the test controller 102 as the destination IP address in the Return packet IP header 352, in one embodiment. The return packet UDP header 354 contains information for application-layer processes at the test controller 102 to use to process the return packet 350.

The TDO data field 356 contains test output data for consumption by the test controller 102. In one embodiment, the TDO data field 356 is generated by the packet processing logic 114 from data from a Test Data Output (TDO) JTAG signal from the testing logic 116. However, the TDO data field 356 may be derived from other than a JTAG TDO signal. In general, the packet processing logic 114 generates the data for the TDO field 356 from whatever test output signal the testing logic 116 provides.

5.0 Example Process of Testing DUT

Figure 4:
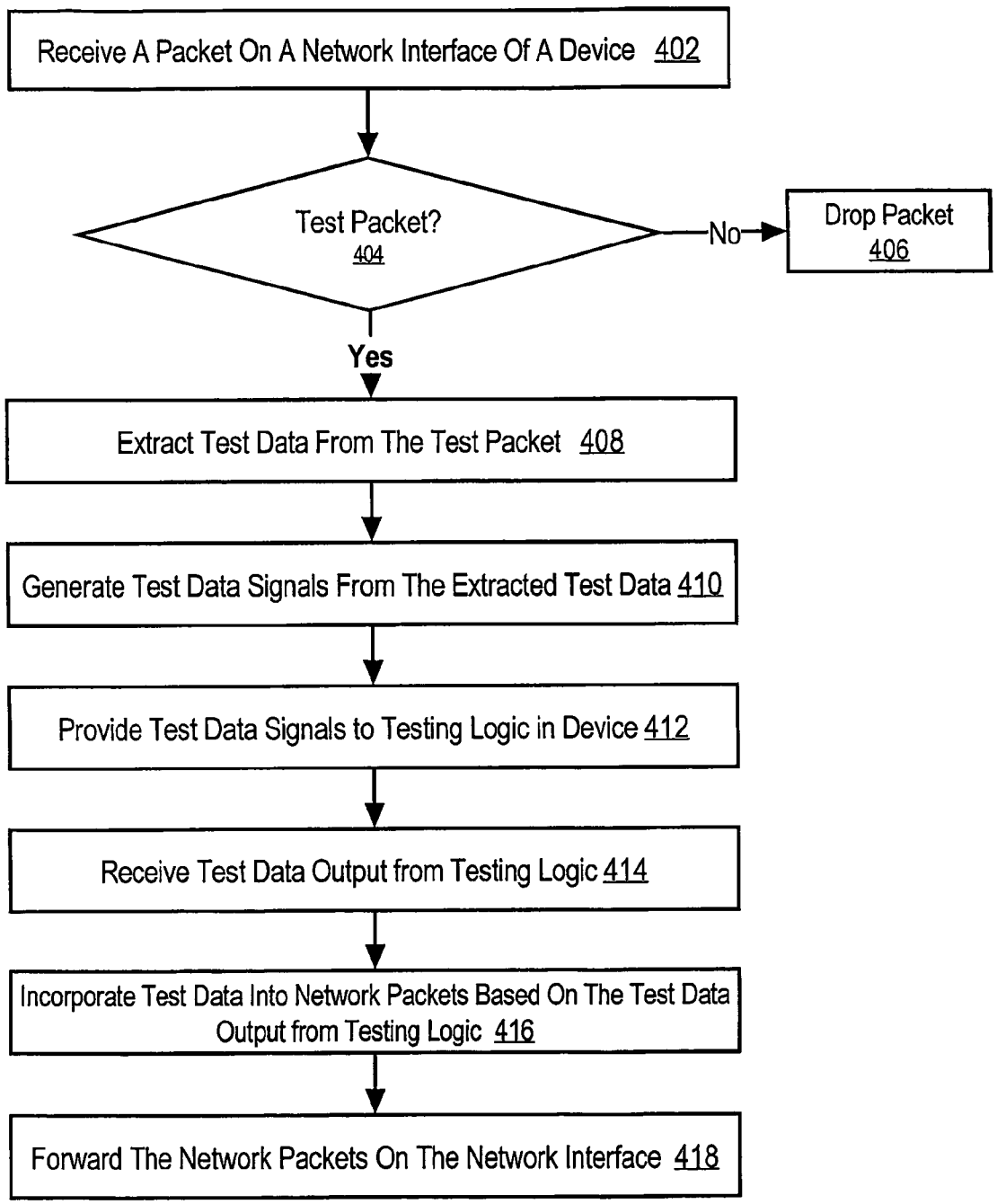
FIG. 4 illustrates an example method for testing a device under test.

FIG. 4 illustrates an example process 400 for testing a DUT, in accordance with an embodiment of the present invention. Process 400 may be implemented by hardware within the DUT 104. In one embodiment, the packet processing logic 114 contains logic encoded in one or more tangible media for execution. When the logic is executed, the logic is operable to perform steps of process 400. Process 400 will be discussed with reference to the example environment 100 of FIG. 1, the example DUT 104 of FIG. 2, the example test packet 300 of FIG. 3A, and example return packet 350 of FIG. 3B. However, process 400 is not so limited. In step 402, the DUT 104 receives a network packet on the network interface 112.

In step 404, the DUT 104 determines whether the network packet is test packet. In one embodiment, the packet processing logic 114 compares the destination MAC address in the network packet with a debug address. If the two addresses match, then the network packet is determined to be a test packet. If the addresses do not match, the network packet is dropped, in step 406. Note that prior to (or after) the packet processing logic 114 comparing the destination MAC address with the debug address, the destination MAC address can be compared with a MAC address for the DUT 104 itself to determine if the network packet is a network packet intended for the DUT 104.

If the packet processing logic 114 determines that the network packet is a test packet, then the packet processing logic 114 extracts test information from the network packet, in step 408. Referring briefly to FIG. 3A, the packet processing logic 114 extracts information from the TDI field 306, the TMS field 308, and the RESET field 310 of the example test packet 300, in one embodiment. The packet processing logic 114 may extract clock information that is implicit in the TDI data field 306, based on the bit pattern. The packet processing logic 114 also saves the source IP address from the Test packet IP header 302 for generating a return packet to the test controller 102.

In step 410, the packet processing logic 114 generates test input signals from the extracted test information. The packet processing logic 114 generates one or more of JTAG signals, in accordance with one embodiment. For example, the packet processing logic 114 may generate the following JTAG signals: TDI, TCK, TMS, and TRST. However, the packet processing logic 114 might generate signals that are compliant with an interface other than JTAG.

In step 412, the packet processing logic 114 provides the test input signals to the testing logic 116. In step 414, the packet processing logic 114 receives a test output signal from the testing logic 116. In one embodiment, the test output signal is a JTAG TDO signal. In step 416, the packet processing logic 114 generates, from the test output signal, one or more return packets to be sent to the test controller 102 from the test output signal. The packet processing logic 114 generates an example return packet 350 as depicted in FIG. 3B, in one embodiment. Included in the packet generation is converting the test output signal to data for the TDO field 356, in one embodiment. The packet processing logic 114 also places the saved IP address of the test controller 102 as the destination address in the Return packet IP header 352.

In step 418, the packet processing logic 114 provides the return test packet to the NIC 108, which outputs the return packet, which is forwarded by other network devices to the test controller 102.

6.0 Authenticating the Test Controller

In order to verify that test packets are originating from a trusted source, the packet processing logic 114 has authentication logic 189 to authenticate the test controller 102, in one embodiment. In one embodiment, the packet processing logic 114 and the test controller 102 implement a challenge handshake authentication protocol ("CHAP") protocol. To implement CHAP, the test controller 102 and the packet processing logic 114 may have a shared secret. The shared secret may be established when the DUT 104 is manufactured. However, the shared secret may be established later. After authenticating the test controller 102, a secure connection may be established such that the DUT 104 does not need to authenticate the source of every test packet.

Note that the DUT 104 may implement the authentication protocol in hardware. For example, the packet processing logic 114, which may be implemented in hardware, executes the authentication protocol, in one embodiment. It is not required that CHAP be used as an authentication protocol. An alternative to CHAP is a Secure Socket Layer ("SSL") handshake.

7.0 Forwarding Test Packets to the Device Under Test

As previously discussed, the test packets may be transferred over the network 106 using an Internet Protocol. However, the packets that are delivered to (and from) the DUT 104 may be transferred using a Layer 2 protocol, such as Ethernet frames. The sequence of transferring packets from the test controller 102 to the DUT 104 is as follows, in one embodiment.

Initial Configuration

Initially, a network administrator configures the last hop router 119 and the DUT 104. The following example parameters used for illustration. The network interface 125 of last hop router 119 may be set to 1.10.2.1 and the network mask may be set to 255.255.255.0, which means that the last hop router 119 expects devices on the network interface 125 to have IP addresses between 1.10.2.1 and 1.10.2.254. The network interface 125 is a LAN interface, in one embodiment. The network administrator may configure the DUT 104 to have the IP address 1.10.2.201. For debugging the DUT 104, the network administrator may use the IP address 1.10.2.207, which is stored in the debug L3 address register 186 of the DUT 104.

Initial Packet Flow

The test controller 102 pings the DUT 104 at 1.10.2.201. The ping (ICMP Hello) passes from router 901, to network edge router 120, to last hop router 119. The last hop router 119 receives the Ping and finds no entry for 1.10.2.201 in the ARP table 112. Last hop router 119 may issue an Address Resolution Protocol (ARP) message requesting that the IP address in the Ping be resolved into a MAC address. When the DUT 104 receives the ARP message, the DUT 104 sends an ARP response that includes the MAC address in the MAC address register 187. That is, the DUT 104 provides the last hop router 119 with the DUT's regular MAC address. The router 119 adds the DUT's regular MAC address to the ARP table 112. The router 119 forwards the ICMP hello from the test controller 102 to the DUT 104 (at 1.10.2.201), using the MAC address that the DUT 104 just provided. The DUT 104 then sends an ICMP response, which is routed to the test controller 102.

Initial Debug Packet Flow

The test controller 102 pings the DUT 104 at 1.10.2.207. That is, the test controller 102 pings using the address that is stored in the debug L3 address register 186 of the DUT 104. The ping (ICMP Hello) passes from router 901, to network edge router 120, to last hop router 119. The last hop router 119 receives the Ping and finds no entry for 1.10.2.207 in the ARP table 112. Last hop router 119 may issue an Address Resolution Protocol (ARP) message requesting that the IP address in the Ping be resolved into a MAC address. The last hop router 119 broadcasts the ARP request an the network interface 125. When the DUT 104 receives this ARP message, the DUT 104 finds the matching IP address in debug L3 address register 186 and sends an ARP response that includes the MAC address in the debug L2 address register 185. That is, the DUT 104 provides the last hop router 119 with the DUT's debug MAC address. The router 119 adds the DUT's debug MAC address to the ARP table 112. The router 119 forwards the ICMP hello from the test controller 102 to the DUT 104 (at 1.10.2.207), using the debug MAC address that the DUT 104 just provided. The DUT 104 then sends an ICMP response, which is routed to the test controller 102. The DUT 104 may then begin to authenticate the test controller 102.

Alternatives

It is not required that an ARP table 122 be used in the process of routing test packets to the DUT 104. In one embodiment, tunneling is used to deliver the test packets. For example, a protocol such as layer 2 Tunneling Protocol version 3 (L2TPv3) is used to allow the test controller 102 and the DUT 104 to exchange layer 2 frames. The layer 2 frames get encapsulated in a layer 3 protocol, such as an IP protocol, in this embodiment.

8.0 Implementation Mechanisms—Hardware Overview

Referring again to FIG. 2, logic encoded in one or more tangible media of DUT 104 cause one or more steps of process 400 to occur, in one embodiment. The logic may be hard-wired circuitry within the NIC 108. For example, the logic is implemented in the packet processing logic 114, in one embodiment. However, as discussed below, software instructions or a combination of hardware and software may be used to implement the logic that performs process 400.

NIC 108 may be coupled to bus 202 for communicating information and command selections to processor 204. NIC 108 may have a serial interface such as an RS-232 or RS-422 interface. The testing logic 116 is logic that is able to receive input test signals to monitor and control the processor 204, in one embodiment. The testing logic 116 outputs a test result signal, based on monitoring and controlling the processor 204.

NIC 108 also provides a two-way data communication coupling to network link 222 that is connected to a local network 222. As an example, NIC 108 may be an integrated services digital network (ISDN) card or a modem to provide a data communication connection to a corresponding type of telephone line. As another example, NIC 108 may be a local area network (LAN) card to provide a data communication connection to a compatible LAN. Wireless links may also be implemented. In any such implementation, NIC 108 sends and receives electrical, electromagnetic or optical signals that carry digital data streams representing various types of information.

Network link 220 typically provides data communication through one or more networks to other data devices. For example, network link 220 may provide a connection through local network 222 to last hop router 119 or to data equipment operated by an Internet Service Provider (ISP). ISP in turn provides data communication services through the world wide packet data communication network now commonly referred to as the "Internet". Local network 222 uses electrical, electromagnetic or optical signals that carry digital data streams. The signals through the various networks and the signals on network link 220 and through NIC 108, which carry the digital data to and from DUT 104, are exemplary forms of carrier waves transporting the information.

DUT 104 includes a bus 202 or other communication mechanism for communicating information, and a processor 204 coupled with bus 202 for processing information. DUT 104 also includes a main memory 206, such as a random access memory (RAM), flash memory, or other dynamic storage device, coupled to bus 202 for storing information and instructions to be executed by processor 204. Main memory 206 also may be used for storing temporary variables or other intermediate information during execution of instructions to be executed by processor 204. DUT 104 further includes a read only memory (ROM) 208 or other static storage device coupled to bus 202 for storing static information and instructions for processor 204. A storage device 210, such as a magnetic disk, flash memory or optical disk, is provided and coupled to bus 202 for storing information and instructions.

In an alternative embodiment, software instructions may be used as an alternative to or in combination with hard-wired circuitry to implement the logic that performs steps of process 400. Thus, the invention is not limited to any specific combination of hardware circuitry and software. Such instructions may be read into main memory 206 from a computer-readable medium, such as storage device 210. Execution of the sequences of instructions contained in main memory 206 causes the processor 204 to perform process steps described herein. One or more processors in a multi-processing arrangement may also be employed to execute the sequences of instructions contained in main memory 206.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to DUT 104 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206, from which processor 204 retrieves and executes the instructions. The instructions received by main memory 206 may optionally be stored on storage device 210 either before or after execution by processor 204.

DUT 104 can send messages and receive data, including program code, through the network(s), network link 220 and NIC 108. In the Internet example, a server might transmit a requested code for an application program through the Internet, ISP, local network 222 and NIC 108. In accordance with an embodiment of the invention, one such downloaded application provides for testing a DUT 104 via a network connection as described herein.

The received code may be executed by processor 204 as it is received, and/or stored in storage device 210, or other non-volatile storage for later execution. In this manner, DUT 104 may obtain application code in the form of a carrier wave.

9.0 Extensions and Alternatives

In the foregoing specification, the invention has been described with reference to specific embodiments thereof. It will, however, be evident that various modifications and changes may be made thereto without departing from the broader spirit and scope of the invention. For example, as an alternative to using a MAC address as the debug address, a layer 3 address could be used. The specification and drawings are, accordingly, to be regarded in an illustrative rather than a restrictive sense.

What is claimed is:

1. An apparatus comprising:
    first logic that is independent of a processor, that is configured to monitor and control the processor, and that receives test input signals and generates a test output signal;
    a network interface that is operable to receive network packets;
    second logic communicatively coupled to the network interface and that is operable to:
        determine whether a packet received on the network interface is a packet for testing the apparatus;
        extract test information from packets received on the network interface that are determined to be test packets;
        generate the test input signals for the first logic from the extracted test information; and
        incorporate test results into network packets based on the test output signal from the first logic;
    wherein the first logic, the network interface and the second logic are components of a device under testing.

2. The apparatus of claim 1, wherein the second logic is further operable to determine whether an address in a packet received in the network interface matches an address stored in the apparatus in order to determine whether a packet received on the network interface is a packet for testing the apparatus.

3. The apparatus of claim 2, wherein the address is a media control access (MAC) address.

4. The apparatus of claim 1, wherein the second logic is further operable to perform an authentication process with a source of a packet that is determined to be a test packet.

5. The apparatus of claim 1, wherein the first logic is operable to perform one or more tests on the apparatus based on the test data signals and to generate the test result data signals based on the one or more tests.

6. The apparatus of claim 1, wherein the test input signals and the test output signal are substantially compliant with a Joint Test Action Group (JTAG) interface.

7. The apparatus of claim 1, further comprising logic to program a register in the second logic with information to determine whether a packet is a test packet.

8. A device comprising:
one or more processors;
logic that is independent of the one or more processors, and that is configured to monitor and control the one or more processors to:
determine whether a packet received on a network interface is a packet for testing an apparatus;
extract test information from packets received on the network interface that the logic determines are test packets;
generate test input signals from the extracted test information;
receive a test output signal; and
incorporate test results into network packets based on the received test output signal;
wherein the logic is a component of a device under testing.

9. The device of claim 8, wherein the logic that is operable to determine whether a packet received on the network interface is a packet for testing the apparatus is further operable, when executed, to determine whether an address in a packet received in the network interface matches an address stored in the apparatus.

10. The device of claim 9, wherein the address is a media control access (MAC) address.

11. The device of claim 8, wherein when executed the logic is further operable to perform an authentication process with a source of a packet that is determined to be a test packet.

12. The device of claim 8, wherein when executed the logic is further operable to perform one or more tests on the apparatus based on the test input signals and to generate the test output signal based on the one or more tests.

13. The device of claim 8, wherein the test input signals and the test output signal are substantially compliant with a Joint Test Action Group (JTAG) interface.

14. The device of claim 8, further comprising logic to program a register with information to determine whether a packet is a test packet.

15. A method comprising:
receiving a packet on a network interface of a device through a testing logic that is independent of a processor of the device and is configured to monitor and control the processor;
determining whether a packet received in the network interface is a test packet for testing the device;
in response to determining that the packet is a test packet performing the following:
extracting test information from packets received on the network interface that are determined to be test packets; and
generating test input signals from the extracted test information;
providing the test input signals to testing logic in the device;
receiving a test output signal from the testing logic;
incorporating test results into network packets based on the test output signal; and
forwarding the packets on the network interface;
wherein the testing logic and the network interface are components of a device under testing.

16. The method of claim 15, wherein determining whether a packet is a test packet comprises determining whether the packet is addressed to an address that is stored in the device.

17. The method of claim 16, wherein the address is a media control access (MAC) address.

18. The method of claim 15, further comprising performing an authentication process with a source of a packet that is determined to be a test packet.

19. The method of claim 15, further comprising performing one or more tests on the apparatus based on the test input signals and generating the test output signal based on the one or more tests.

20. The method of claim 15, wherein the test input signals and the test output signal are substantially compliant with a Joint Test Action Group (JTAG) interface.

* * * * *

UNITED STATES PATENT AND TRADEMARK OFFICE
CERTIFICATE OF CORRECTION

| | | |
|---|---|---|
| PATENT NO. | : 7,801,050 B2 | Page 1 of 1 |
| APPLICATION NO. | : 11/638059 | |
| DATED | : September 21, 2010 | |
| INVENTOR(S) | : Somnath Mitra | |

It is certified that error appears in the above-identified patent and that said Letters Patent is hereby corrected as shown below:

Column 11, Claim 8, Line 20, delete "and" after processors,

Signed and Sealed this

Thirtieth Day of November, 2010

David J. Kappos
*Director of the United States Patent and Trademark Office*